(12) United States Patent
Huber

(10) Patent No.: US 7,798,532 B2
(45) Date of Patent: Sep. 21, 2010

(54) DEVICE FOR CONNECTING PARTS

(75) Inventor: Maximilian Huber, Linkenheim (DE)

(73) Assignee: BOA Balg-Und Kompensatoren-Technologie GmbH, Stutensee (DE)

( * ) Notice: Subject to any disclaimer, the term of this patent is extended or adjusted under 35 U.S.C. 154(b) by 0 days.

(21) Appl. No.: 11/038,220

(22) Filed: Jan. 21, 2005

(65) Prior Publication Data

US 2005/0127670 A1 Jun. 16, 2005

Related U.S. Application Data

(63) Continuation of application No. 10/298,662, filed on Nov. 19, 2002, now Pat. No. 6,902,202.

(30) Foreign Application Priority Data

Nov. 30, 2001 (DE) ................................ 101 58 877

(51) Int. Cl.
*F16L 11/12* (2006.01)
(52) U.S. Cl. ...................................... 285/49; 285/288.1
(58) Field of Classification Search .................... 285/49, 285/416, 288.1–288.4, 226–229, 368, 50; 138/121
See application file for complete search history.

(56) References Cited

U.S. PATENT DOCUMENTS

| 3,169,785 | A  | * | 2/1965 | Ziebold ....................... 285/226 |
| 3,420,553 | A  | * | 1/1969 | Poxon et al. .................... 285/49 |
| 4,659,117 | A  | * | 4/1987 | Holzhausen et al. ........... 285/49 |
| 5,865,475 | A  | * | 2/1999 | Winzen et al. ............ 285/288.1 |
| 6,116,287 | A  | * | 9/2000 | Gropp et al. ................. 138/121 |
| 6,386,594 | B1 | * | 5/2002 | Schuttler et al. ............. 285/251 |
| 6,568,715 | B2 | * | 5/2003 | Cwik .......................... 285/301 |
| 6,948,744 | B2 | * | 9/2005 | Atansoski et al. ............ 285/226 |

* cited by examiner

*Primary Examiner*—Aaron Dunwoody
(74) *Attorney, Agent, or Firm*—McGlew and Tuttle, P.C.

(57) ABSTRACT

A device for connecting parts of an exhaust gas system which comprises at least one metal tube formed from a bellows and optionally further parts disposed coaxially within and/or outside of the bellows and at least one further system part to be connected to the metal tube, are characterized in that one end of a short connecting tube is inserted positively in an end of the metal tube and the other end is inserted positively in the system part to be connected to the metal tube, and the system part is moved to the end of the metal tube facing the system part, thereby leaving an axial gap, and the system part, the connecting tube and the metal tube being connected from the outside in one working step.

22 Claims, 6 Drawing Sheets

DEVICE FOR CONNECTING PARTS

CROSS REFERENCE TO RELATED APPLICATIONS

This application is a continuation under 37 CFR 1.53(b) of pending prior application Ser. No. 10/298,662 filed on Nov. 19, 2002 and claims the benefit of priority under 35 U.S.C. §119 of German Application DE 101 58 877.1 filed Nov. 30, 2001, the entire contents of each application are incorporated herein by reference.

FIELD OF THE INVENTION

The invention relates to a device for connecting parts of an exhaust gas system using at least one metal tube formed from a bellows and optionally further parts which are disposed coaxially inside and/or outside of the bellows, and at least one further system part to be connected to the metal tube.

BACKGROUND OF THE INVENTION

In exhaust gas systems, in particular for motor vehicles, metal tubes are conventionally used having a woven jacket, a bellows disposed therein, an agraff-inliner, and optional further equipment. They are preferably used for tube-tube connections. A part of the exhaust gas system, e.g. a tube, is thereby inserted into the metal tube at the input and output sides and welded thereto.

A special variant of this type of connection is a flange connection structure wherein at least one end of the metal tube is provided with a system part which is configured as a connecting flange and which can be connected to the exhaust gas system at an existing point of separation.

To join the connection flange to the metal tube, the flange is conventionally pushed onto a ring provided at one end of the metal tube—without using further components—and welded to the metal tube from the inside.

This procedure precludes welding from the outside in order to guarantee reliable connection of all layers of the tube end.

Disadvantageously, in the MAG welding method (MAG=metal active gas; electric welding method with supplied welding wire which is melted-on) used therefor, welding spatters form which can deposit on the inner side of the metal tube, in particular of the agraff, since complete shielding of the inliner is thereby not possible. This is undesirable, since such material deposits have negative effects on the function of the metal tube, e.g. on its elastic properties, and can damage the engine and/or catalytic converter if they come off during operation.

To prevent these disadvantages, the welding spatters must be removed in a later, costly processing step.

For this reason, the above-described arrangement can be optionally fashioned with an additional intermediate tube disposed inside the metal tube between the connection flange and metal tube to prevent welding spatters.

Towards this end, the flange and the metal tube are pushed onto the intermediate tube and welded thereto from the outside using MAG welding.

This method is disadvantageous in that a second weld seam must be provided which increases production costs and the overall length of the arrangement is increased by approximately the length of the intermediate tube.

SUMMARY OF THE INVENTION

It is therefore the underlying purpose of the present invention to produce a method and a device for connecting parts of an exhaust gas system, which eliminate the above-mentioned disadvantages and prevent welding splatter inside of the metal tube at minimum production cost without substantially increasing the overall length of the arrangement.

This object is achieved in accordance with the invention in that one end of a short connecting tube is positively inserted into one end of the metal tube and its other end is positively inserted into the system part to be connected with the metal tube, in particular a connection flange, wherein the system part is moved to the end of the metal tube facing the system part leaving an axial gap therebetween, and the system part, the connecting tube and the metal tube are connected to one another from the outside in one processing step.

A short connecting tube is used instead of the intermediate tube and the system part can therefore be moved towards the end of the metal tube, leaving only a small axial gap. This permits connection of the system part, connecting tube and metal tube from the outside in one working step, with one single seam. External welding prevents spatters which adhere to the inside of the metal tube. The axial gap ensures that the generally thin wall of the bellows (i.e. the metal tube) is sealingly joined to the connecting tube in a controlled manner without requiring an excessive amount of heat. Such excessive heating could damage the welded portion of the tube and/or the weld seam to result in a leaky joint.

Although the seam must, in principle, extend only partially along the circumference of the connecting tube in the region of the axial gap (weld adhesion, interrupted weld seam), in a preferred embodiment, it extends over the entire circumference of the connecting tube in the region of the gap thereby producing a completely gas-tight connection.

One decisive standpoint of the invention consists in that all layers of the metal tube are connected. For embodiments with a weld seam connection, a particularly preferred embodiment of the invention provides that the weld seam has a specified fusion penetration in all bordering components.

To adapt the system part and metal tube to different cross-sectional combinations, the connection tube can be tapered or stepped, i.e. the two ends can have different cross-sections, wherein the tapering can be effected in the direction of gas flow or opposite thereto. In a further embodiment, the connecting tube can have a plurality of steps wherein e.g. three or more diameters are provided sequentially, which each differ from the previous diameter.

While the tube cross-sections can have any shape, such as elliptical or oval, and both ends can have different contours, in a preferred embodiment of the invention, at least one of the two facing cross-sections of metal tube and system part are circular. Both cross-sections can also be circular.

If the metal tube and the system part have identical circular cross-sections, the connecting tube is preferably a hollow cylinder with such a cross-section. When the metal tube and the system part have different cross-sections, they are adapted in accordance with the invention in that one end of the connecting tube has a first outer diameter corresponding to the inner diameter of the system part and the other end of the connecting tube has a second outer diameter which corresponds to the inner diameter of the end of the metal tube facing it, wherein the transition between first and second outer diameters of the connecting tube to a central part of the connecting tube is continuous, and in particular, the central part has a truncated conical shape.

In an extremely advantageous variant of the inventive method, in which a seal is provided between an end-side sealing surface of the system part and a counter piece opposite thereto, the seal to be inserted between the system part and the counter piece is centered wherein, in accordance with a preferred embodiment of the invention, the system part and its counter piece are preferably formed as flanges. The use of a seal, in particular of a flat seal is thereby particularly preferred in accordance with the invention.

Centering is obtained in that the connecting tube extends in the direction of the tube axis, i.e. has an axial length such that it projects past the sealing surface of the system part by an amount M which corresponds approximately to the thickness of the seal to be used. In particular, this considerably simplifies mounting of a flanged joint and seal.

With corresponding increased projecting length and suitable design of the connecting tube, the counter piece, in particular a counter flange can also be centered.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
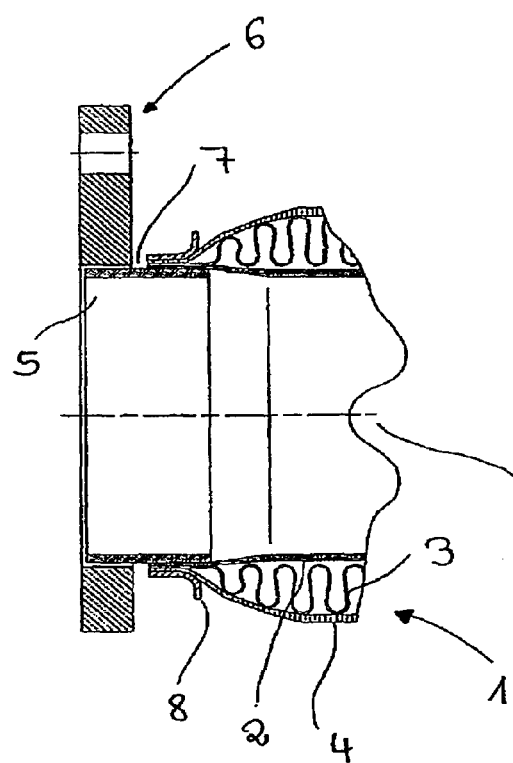
FIG. 1a is a sectional view of the inventive connection between a metal tube and a connection flange with a cylindrical connecting tube, without seam.

Referring to the drawings in particular, FIG. 1 shows a sectional view, in a plane perpendicular to tube axis A, of a connection between parts of an exhaust gas system.

In the embodiment shown, the metal tube 1 comprises an agraff-inliner 2, a metal bellows 3 and an outer woven jacket 4 disposed coaxially, radially from the inside towards the outside.

A short connecting tube 5, which, in the embodiment shown, is formed as a hollow cylinder with circular cross-section is positively inserted with one end in a connecting flange 6 and with the other end in the metal tube 1 such that only a small axial gap 7 remains between the connecting flange 6 and the metal tube 1. An angle flange 8 is also disposed at the gap-side end of the metal tube 1.

Figure 1B:
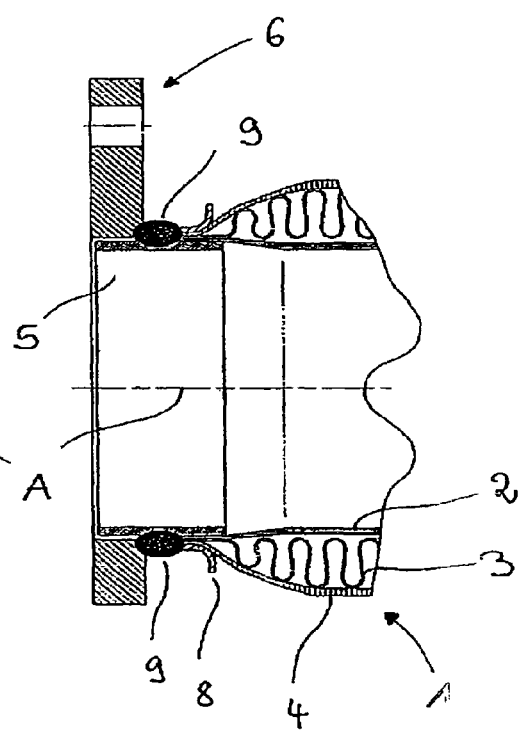
FIG. 1b is a sectional view of the same connection as FIG. 1a, however, with a weld seam.

FIG. 1b shows a weld seam 9 which joins together the connecting tube 6, along its entire periphery and in the region of the axial gap 7, with the connecting flange 6 and all layers 2, 3, 4, 8 of the metal tube 1. Towards this end, the weld seam 9 has a certain fusion penetration in all of those neighboring components.

In the embodiment of FIG. 1a and FIG. 1b, the metal tube 1 and the connecting flange 6 have substantially identically sized (circular) cross-sections such that, in accordance with the inventive method, a hollow-cylindrical connecting tube 5 with identical cross-section is used. The (identical) inner diameters of the metal tube 1 and of the connecting flange 6 correspond to the outer diameter of the connecting tube 5.

Figures 2A, 2B:
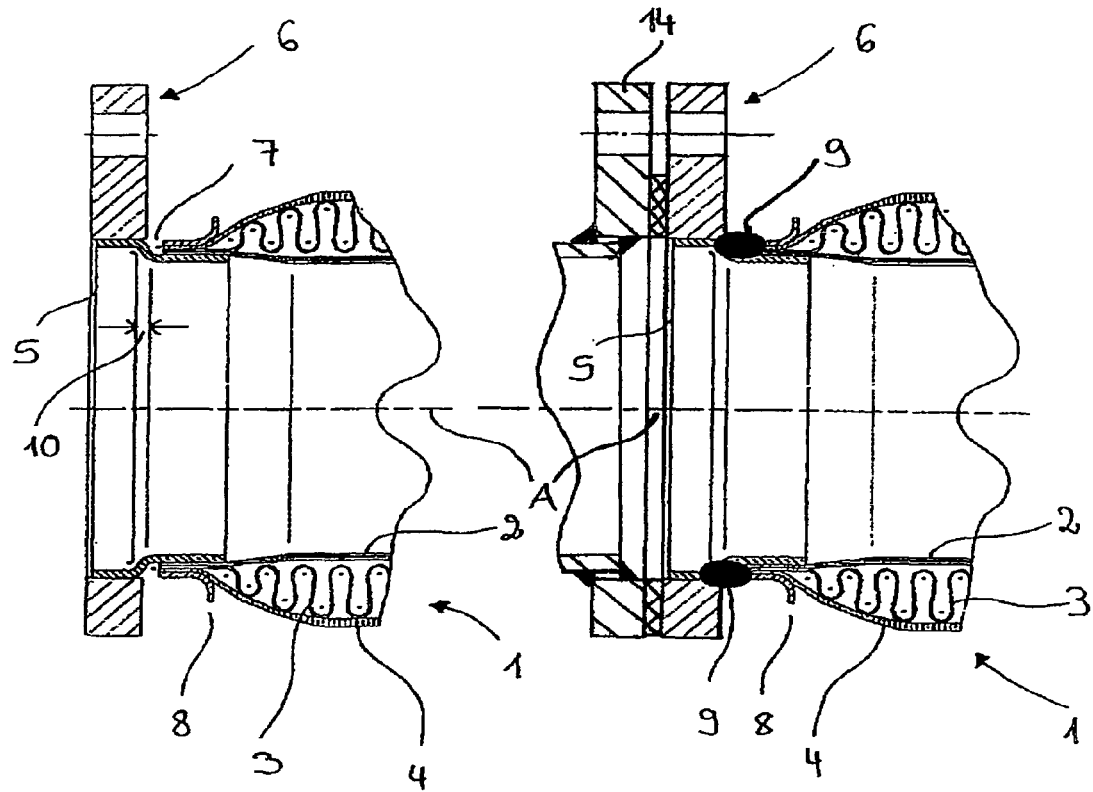
FIG. 2a is a sectional view of the same connection as FIG. 1a, however, with a stepped or tapered connecting tube.
FIG. 2b is a sectional view of the same connection as FIG. 2a, however with a weld seam.

FIG. 2a and FIG. 2b are sectional views as in FIG. 1a and FIG. 1b showing, however, a connection produced with the inventive method for an embodiment in which the metal tube 1 and the connecting flange 6 have different inner cross-sections or diameters. The connecting tube 5 is designed correspondingly such that one end has an outer diameter corresponding to the inner diameter of the metal tube 1 and its other end has an outer diameter which corresponds to the inner diameter of the connecting flange 6. The transition from one diameter to the other is continuous in a central region 10 of the connecting tube 5, which is located approximately in the region of the axial gap 7. In the concrete embodiment shown, the metal tube 1 and connecting flange 6 each have circular cross-sections and the connecting tube 5 has a truncated conical shape in the central region 10. The connecting flange 6 joins onto a counter piece 14.

Figures 3A, 3B:
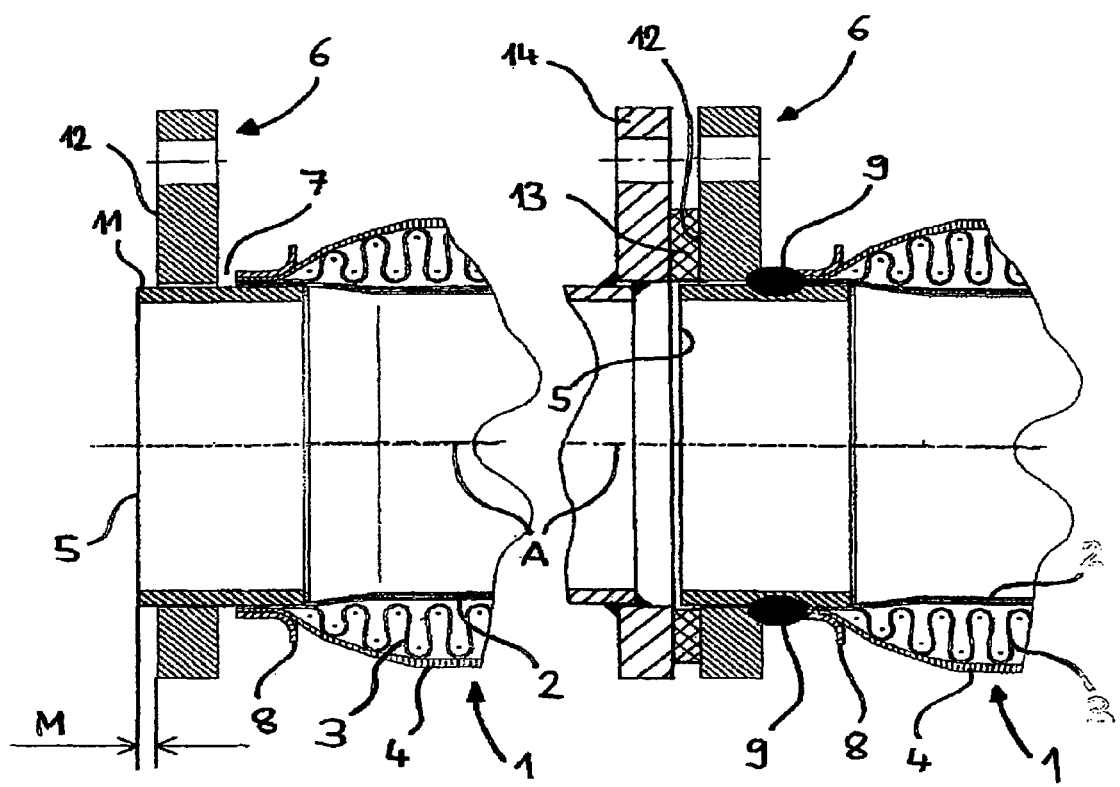
FIG. 3a is a sectional view of the same connection as FIG. 1a, however, with an extended connecting tube providing additional centering.
FIG. 3b is a sectional view of the same connection as FIG. 3a, however, with a weld seam and a centered flat seal.

FIG. 3a and FIG. 3b show sectional views corresponding to FIGS. 1a through 2b of a connection produced with the inventive method comprising a connecting tube 5 which projects 11 past a sealing surface 12 of the connecting flange 6 on a side of the connecting flange 6 facing the metal tube 1. This projecting length 11 of the connecting tube 5 has a length M.

FIG. 3b shows an additional flat annular seal 13 which is pushed onto the connecting tube 5 at its projecting region 11 and against the sealing surface 12 of the connecting flange thereby centering it via the connecting tube 5. The thickness of the flat seal 13 corresponds substantially to the length M of the projecting length 11. The seal 13 is disposed between the connecting flange 6 and counter piece 14.

Figures 4A, 4B:
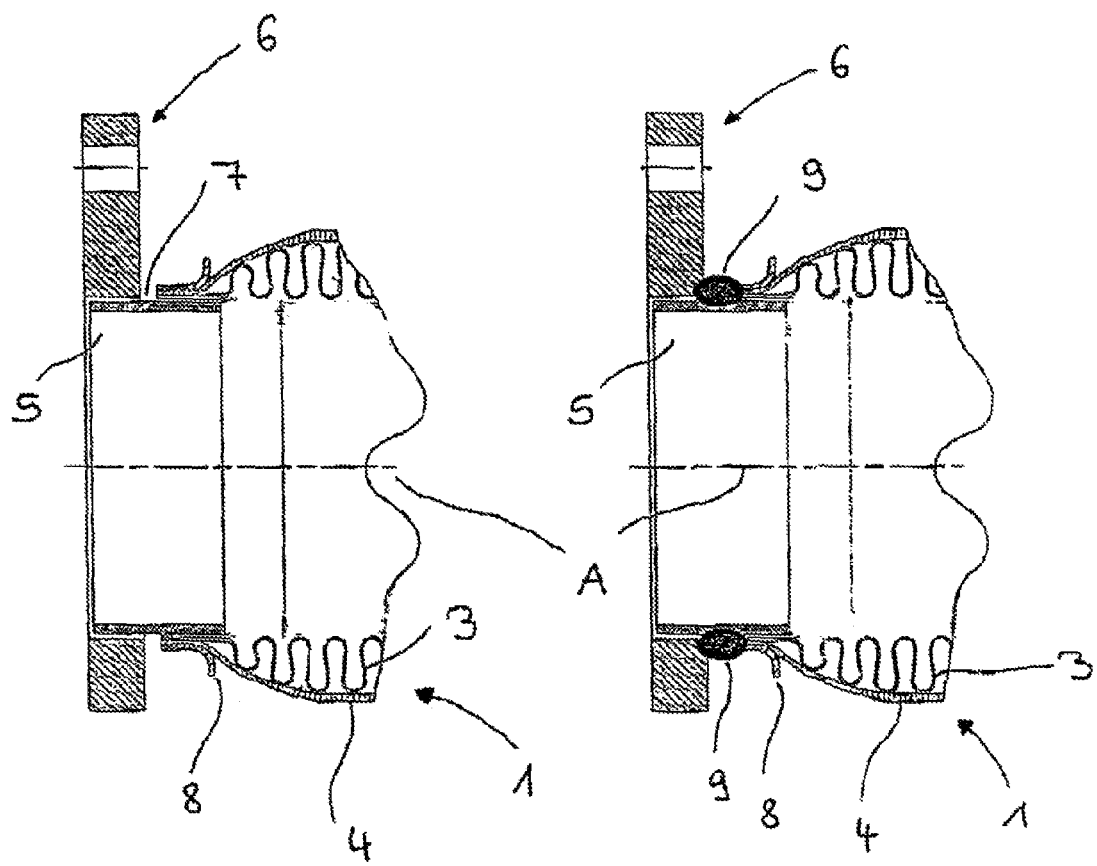
FIG. 4a is a sectional view of the same connection as FIG. 1a, however with an additional element located outside of the metal tube and the sealing bellows.
FIG. 4b is a sectional view of the same connection as FIG. 4a, however with a weld seam.

FIG. 4a and FIG. 4b are sectional views showing the additional element 4 located outside of the metal tube and the sealing bellows 3.

Figure 5A:
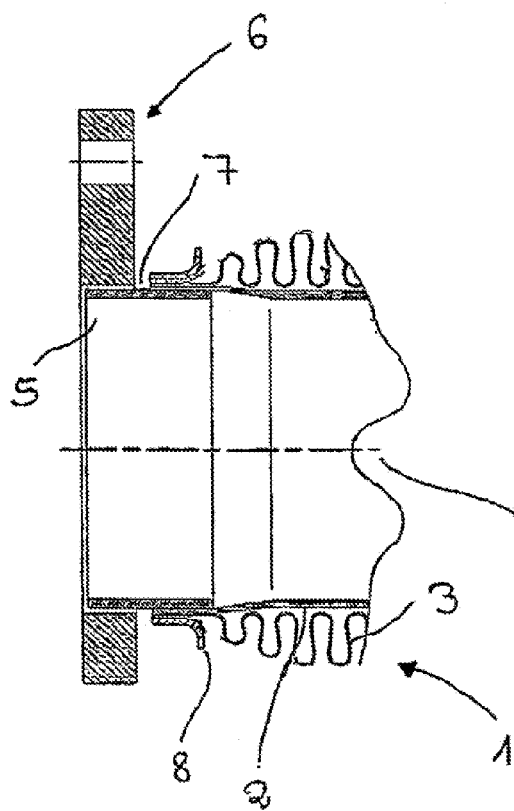
FIG. 5a is a sectional view of the same connection as FIG. 1a, however with an additional element located in a position within the metal tube and within an interior surface of the sealing bellows.
Figure 5B:
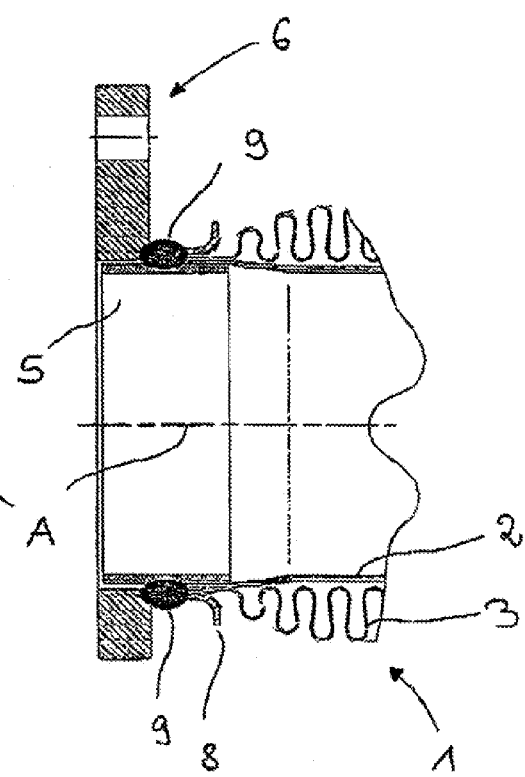
FIG. 5b is a sectional view of the same connection as FIG. 5a, however with a weld seam.

FIG. 5a and FIG. 5b are sectional views showing the additional element 4 located in a position within the metal tube 1 and within an interior surface of the sealing bellows 3.

Figure 6A:
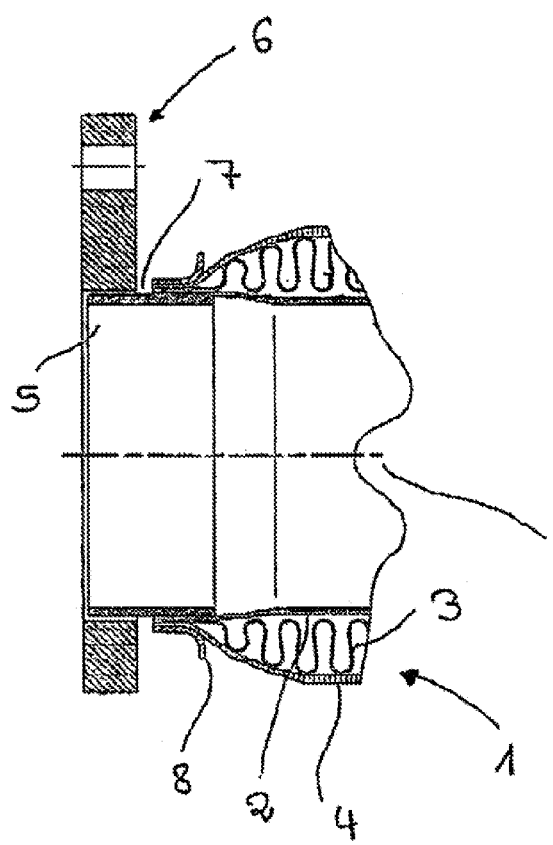
FIG. 6a is a sectional view of the same connection as FIG. 1a, however with an axial gap.
Figure 6B:
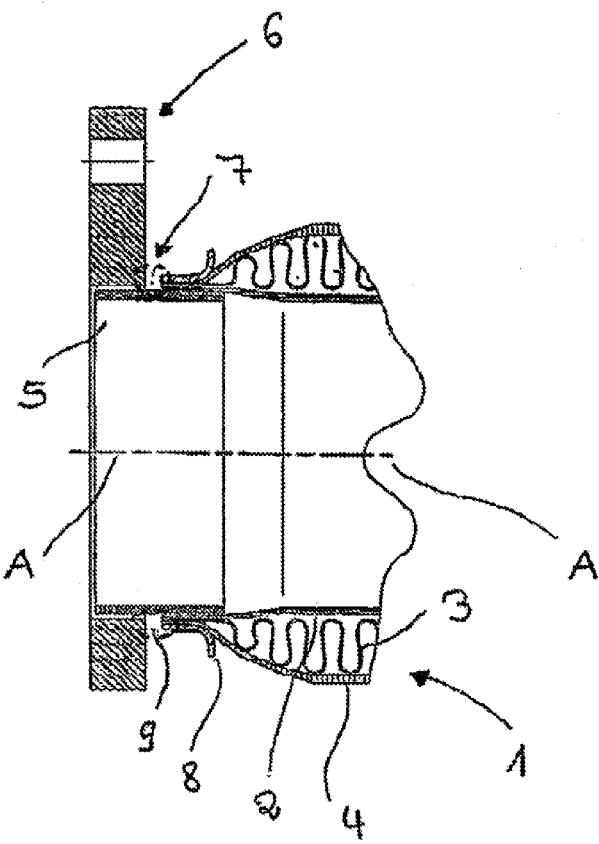
FIG. 6b is a sectional view of the same connection as FIG. 6a, however with a weld seam.

FIG. 6a and FIG. 6b are sectional views showing the axial gap 7 defined by a portion of the metal tube 1, a portion of the system part 6 and a portion fo the connecting tube 5.

All eight figures, in particular the respective partial FIGS. 1b, 2b, 3b, 4b, 5b and 6b clearly show that the inventive method produces a device for connecting parts of an exhaust gas system which requires only one seam 9 for secure connection of the relevant components 1, 5, 6 and which moreover ensures that during production, no material is deposited and accumulates within the metal tube 1 which would impair subsequent operation of the exhaust gas system.

While specific embodiments of the invention have been described in detail to illustrate the application of the principles of the invention, it will be understood that the invention may be embodied otherwise without departing from such principles.

I claim:

1. A device for connecting parts of an exhaust system of a motor vehicle, the device comprising:
a metal tube comprising at least one bellows, a first additional member and a second additional member, said first additional member being an agraff tube, said second additional member being a woven tube, said first additional member being disposed coaxially with said bellows, said first additional member being disposed within said bellows, said second additional member being arranged in a position located outside of said bellows, said agraff tube and said woven tube extending along an entire length of said bellows;
a system part connected to said metal tube;
a connecting tube disposed between said metal tube and said system part, wherein a portion of said metal tube, a portion of said system part and a portion of said connecting tube define an axial gap, said connecting tube having a length that is less than a length of said metal tube, one end of said connecting tube extending radially within said metal tube, another end of said connecting tube extending radially within said system part, said axial gap receiving welding material from a radially outward direction such that said welding material forms a single weld seam, said single weld seam connecting said metal tube and said system part with said connecting tube, said first additional member, said second additional member and said bellows being connected to each other via said single weld seam.

2. The device of claim 1, wherein said weld seam extends over an entire periphery of said connecting tube.

3. The device of claim 1, wherein said weld seam fuses together said metal tube, said connecting tube, and said system part.

4. The device of claim 1, wherein a first and a second end of said connecting tube have different cross-sections for adaptation to different cross-sectional combinations between said metal tube and said system part.

5. The device of claim 1, wherein at least one of two facing cross-sections of said metal tube and said system part is circular.

6. The device of claim 5, wherein both facing cross-sections of said metal tube and said system are circular.

7. The device of claim 6, wherein said two facing cross-sections of said metal tube and said system part have identical diameters.

8. The device of claim 7, wherein said connecting tube is formed as a hollow cylinder with circular cross-section.

9. The device of claim 6, wherein said two facing cross-sections of said metal tube and said system part have different diameters.

10. The device of claim 9, wherein said second end of said connecting tube has a second outer diameter corresponding to an inner diameter of said system part and said first end of said connecting member has a first outer diameter corresponding to an inner diameter of an end of said metal tube, wherein a transition between said first and said second outer diameters of said connecting tube to a central region of said connecting tube is continuous.

11. The device of claim 10, wherein said transition of said connecting tube has a shape of a truncated conical central region.

12. The device of claim 1, wherein said connecting tube has a connecting tube projecting end having an axial length extending beyond an end of said system part on a side of said system part facing away from said metal tube.

13. The device of claim 12, wherein said axial length corresponds substantially to a thickness of a seal located between said system part and a counter piece.

14. The device of claim 13, wherein the seal to be used between said system part and the counter piece is centered by said projecting end of said connecting tube.

15. The device of claim 13, wherein said projecting amount of said connecting tube is selected such that the counter piece is centered thereby.

16. The device of claim 13, wherein the seal is flat.

17. The device of claim 1, wherein said system part is formed as a connecting flange.

18. The device of claim 17, wherein a counter piece cooperates with the connecting flange, the counter piece defining a counter flange.

19. The device of claim 1, wherein said metal tube comprises, at least one of a woven jacket disposed outside of said bellows, an agraff-liner disposed inside said bellows, and an angle flange.

20. A device for connecting parts of an exhaust system of a motor vehicle, the device comprising:
a metal tube comprising a bellows, a first flexible part and a second flexible part, said first flexible part and said second flexible part defining a space, said bellows being located in said space, wherein said bellows is located between said first flexible part and said second flexible part, said bellows having a bellows end portion, said bellows having a bellows interior surface and a bellows outer surface, said first flexible part being located opposite said bellows interior surface, said second flexible part being located opposite said bellows outer surface, said first flexible part having a first flexible part end portion, said second flexible part having a second flexible part end portion, said metal tube having a metal tube length, said first flexible part having an inner first flexible part surface, said first flexible part and said second flexible part extending along an entire length of said bellows;
a system part connected to said metal tube, said system part having a longitudinally extending system part surface;
welding material;
a connecting tube, said connecting tube having an outer connecting tube surface, said longitudinally extending system part surface, said bellows end portion, said first flexible part end portion, said second flexible part end portion and a portion of said outer connecting tube surface defining an axial gap, said portion of said outer connecting tube surface extending between said metal tube and said system part, said connecting tube having a connecting tube length, said connecting tube length being less than said metal tube length, one end of said connecting tube extending radially within said metal tube such that a portion of said connecting tube is in contact with said inner first flexible part surface, another end of said connecting tube extending radially within said system part such that another portion of said connecting tube is in contact with said system part, said axial gap receiving said welding material from a radially outward direction such that said welding material forms a single weld seam, said single weld seam connecting said first flexible part, said bellows, said second flexible part and said system part with said connecting tube, wherein said first flexible part, said second flexible part and said bellows are connected to each other via said single weld seam, said single weld seam contacting said bellows end portion, said first flexible part end portion, said second flexible part end portion, said connecting tube and said system part, said single weld seam fixing said bellows end portion, said first flexible part end portion and said second flexible part end portion to said system part and said connecting tube, at least a portion of said single weld seam being located in a position outside of said metal tube and said connecting tube.

21. A device for connecting parts of an exhaust system of a motor vehicle, the device comprising:
- a metal tube comprising at least one bellows and at least one additional member, said bellows having a bellows interior surface, said at least one additional member being disposed coaxially with said bellows, said at least one additional member being disposed in a position inside said bellows, said at least one additional member being arranged opposite said bellows interior surface, said at least one additional member extending along an entire length of said at least one bellows;
- a system part;
- a connecting tube, wherein a portion of said metal tube, a portion of said system part and a portion of said connecting tube define an axial gap, said portion of said connecting tube extending from one end of said metal tube to one side of said system part, said connecting tube having a length that is less than a length of said metal tube, one end of said connecting tube extending radially within said metal tube, another end of said connecting tube extending radially within said system part, said axial gap receiving welding material from a radially outward direction such that said welding material forms a single weld seam, said metal tube being connected to said system part and said connecting tube via said single weld seam, wherein said at least one additional member is connected to said bellows via said single weld seam.

22. A device for connecting parts of an exhaust system of a motor vehicle, the device comprising:
- a metal tube comprising at least one bellows and at least one additional member, said bellows having a bellows exterior surface, said at least one additional member being disposed coaxially with said bellows such that said at least one additional member is arranged in a position located outside said bellows, said at least one additional member being located opposite said bellows exterior surface, said at least one additional member extending along an entire length of said at least one bellows;
- a system part;
- a connecting tube comprising a connecting tube portion, said connecting tube portion extending between said metal tube and said system part, wherein a portion of said metal tube, a portion of said system part and said connecting tube portion define an axial gap, said connecting tube having a length that is less than a length of said metal tube, one end of said connecting tube extending radially within said metal tube, another end of said connecting tube extending radially within said system part, said axial gap receiving welding material from a radially outward direction such that said welding material forms a single weld seam, said metal tube and said system part being connected to said connecting tube via said single weld seam, wherein said bellows is connected to said at least one additional member via said single weld seam.

\* \* \* \* \*